(12) United States Patent
Alders et al.

(10) Patent No.: US 10,521,512 B2
(45) Date of Patent: Dec. 31, 2019

(54) DYNAMIC TEXT-TO-SPEECH RESPONSE FROM A SMART SPEAKER

(71) Applicant: BOSE CORPORATION, Framingham, MA (US)

(72) Inventors: Jamie Alders, Dover, MA (US); Zukui Song, Wellesley, MA (US); Shiufun Cheung, Lexington, MA (US); Eric J. Freeman, Sutton, MA (US)

(73) Assignee: BOSE CORPORATION, Framingham, MA (US)

( * ) Notice: Subject to any disclaimer, the term of this patent is extended or adjusted under 35 U.S.C. 154(b) by 116 days.

(21) Appl. No.: 15/607,101

(22) Filed: May 26, 2017

(65) Prior Publication Data

US 2018/0341643 A1    Nov. 29, 2018

(51) Int. Cl.
| | |
|---|---|
| *G06F 17/28* | (2006.01) |
| *G10L 15/18* | (2013.01) |
| *G06F 17/30* | (2006.01) |
| *G06F 16/9032* | (2019.01) |
| *G10L 21/0364* | (2013.01) |
| *G10L 13/033* | (2013.01) |
| *G10L 15/22* | (2006.01) |

(52) U.S. Cl.
CPC ........ *G06F 17/28* (2013.01); *G06F 16/90332* (2019.01); *G10L 13/033* (2013.01); *G10L 15/1822* (2013.01); *G10L 21/0364* (2013.01); *G10L 15/22* (2013.01); *G10L 2015/223* (2013.01); *G10L 2015/226* (2013.01)

(58) Field of Classification Search
CPC ............... G06F 17/18; G06F 17/30976; G10L 15/1822; G10L 15/22

USPC ......................................................... 704/275
See application file for complete search history.

(56) References Cited

U.S. PATENT DOCUMENTS

| | | | |
|---|---|---|---|
| 2005/0131558 A1 | 6/2005 | Braithwaite et al. | |
| 2014/0279889 A1* | 9/2014 | Luna | G06F 16/27 707/626 |
| 2014/0303971 A1* | 10/2014 | Yi | H04M 1/605 704/233 |
| 2014/0379343 A1* | 12/2014 | Karimi-Cherkandi | G10L 21/02 704/246 |
| 2015/0156031 A1* | 6/2015 | Fadell | H04L 12/2816 700/276 |
| 2016/0236690 A1* | 8/2016 | Juneja | G06F 3/16 |
| 2016/0357505 A1* | 12/2016 | Larsson | G06F 3/165 |

(Continued)

FOREIGN PATENT DOCUMENTS

WO    2018039009 A1    3/2018

OTHER PUBLICATIONS

International Search Report and Written Opinion from corresponding International Application No. PCT/US2018/033113 dated Jul. 26, 2018.

*Primary Examiner* — Edwin S Leland, III
(74) *Attorney, Agent, or Firm* — Lando & Anastasi, LLP

(57) ABSTRACT

A method of operating a situationally aware speaker associated with a virtual personal assistant (VPA) service provider that comprises receiving an indication of at least one parameter of an environment proximate the situationally aware speaker, and delivering the response to the vocal query to the user formatted as speech through an audio output of the situationally aware speaker, at least one audio parameter of the response set based on the indication of the at least one parameter.

26 Claims, 8 Drawing Sheets

(56) References Cited

U.S. PATENT DOCUMENTS

| | | | |
|---|---|---|---|
| 2016/0379638 A1 | 12/2016 | Basye et al. | |
| 2017/0025124 A1* | 1/2017 | Mixter | G10L 15/32 |
| 2018/0061393 A1* | 3/2018 | Osotio | G10L 13/0335 |
| 2018/0341643 A1* | 11/2018 | Alders | G10L 13/033 |
| 2019/0014435 A1* | 1/2019 | Baijal | H04S 7/307 |

* cited by examiner

US 10,521,512 B2

DYNAMIC TEXT-TO-SPEECH RESPONSE FROM A SMART SPEAKER

TECHNICAL FIELD

Aspects and implementations of the present disclosure are directed generally to customizing responses of a smart speaker to commands or queries by a user based at least in part upon one or more parameters of the environment around the smart speaker.

BACKGROUND

Smart speakers having access to virtual personal assistant (VPA) services are devices that respond to user queries, which may be in the form of spoken queries, by searching for a response to the query of the user, for example, using the internet and provide the response to the user, often in the form of an audible response such as synthesized speech. Smart speakers having access to VPA services may also respond to user commands to play audio from a specified audio source, for example, an internet radio station, or to control a smart device, for example, to turn on or off a light or change a setting of another smart device that the smart speaker has access to, for example, via Wi-Fi signals either directly or through an internet router of the user. Queries or commands are typically provided to a VPA through a smart speaker or other device by a user after the user presses a button or says a wake up word or phrase, for example, "Alexa" that indicates to the smart speaker or other device that the user is addressing the VPA. VPA enabled devices are becoming more prevalent with various companies providing competing devices, for example, the Echo™ device from Amazon, Google Home™ device from Google, and various devices incorporating the Siri™ application from Apple. Current smart speakers are not situationally aware. They lack the ability to, for example, detect parameters of the environment around them such as location of a person, a number or people around the smart speaker, or ambient noise levels. Current smart speakers cannot tailor VPA responses to user queries or commands based on environmental parameters.

SUMMARY

In accordance with an aspect of the present disclosure, there is provided a method of operating a situationally aware speaker. The method comprises receiving an indication of at least one parameter of an environment proximate the situationally aware speaker, receiving audio information at the situationally aware speaker from a virtual personal assistant, and modifying the audio information based on the indication of the at least one parameter. Receiving the audio information may comprise receiving an audio response to a query spoken to the situationally aware speaker by a user. The method may further comprise rendering the audio response through the situationally aware speaker.

In some implementations, the method comprises modifying the audio information by setting a volume of the response based on the indication of the at least one parameter. The at least one parameter may be one or more of a volume of the query, a volume of background noise sensed by an audio sensor of the situationally aware speaker, or an identity of the user.

Modifying the audio information may include one or more of adjusting a volume, a tone, an equalization, a tone, or a speed of rendering of the audio information. The at least one parameter may include one or more of a volume of a query provided to the situationally aware speaker, a volume of background noise, a frequency spectrum of background noise, an identity of the user, a location of the user, a time of day, a physiological parameter of a person proximate the situationally aware speaker, a response by the user to a previous response provided by the situationally aware speaker, or a state of activity of one or more devices proximate the situationally aware speaker.

In some implementations, the method comprises setting a volume of the response based on a location of the user. The method may further comprise selecting a speaker through which to deliver the response based on the location of the user or setting a volume of the response based on a distance of the user from the situationally aware speaker.

In some implementations, the method comprises setting a volume of the response based on one or more of a time of day, a physiological parameter of a person within hearing distance of the situationally aware speaker, a response by the user to a previous response provided by the situationally aware speaker, or a state of activity of one or more devices proximate the situationally aware speaker.

In some implementations, the method comprises setting a tone of the response based on the indication of the at least one parameter. The method may include formatting the response as one of a simulated whisper, a simulated shout, or with low frequency components of the response removed. The tone of the response may be set based on one or more of a volume of the vocal query, a volume of background noise sensed by the audio sensor, an identity of the user, a location of the user, a time of day, a physiological parameter of a person within hearing distance of the situationally aware speaker, a frequency spectrum of background noise sensed by the audio sensor, or a response by the user to a previous response provided by the situationally aware speaker.

In some implementations, the method comprises setting a speed of simulated speech of the response based on the indication of the at least one parameter. The speed of simulated speech of the response may be set based on one of a speed of speech of the vocal query or an identity of the user.

In accordance with another aspect, there is provided a method of dynamically formatting a response of a virtual personal assistant (VPA) service provider to a query of a user. The method comprises receiving an indication of a vocal query received from a user through an audio sensor of a device having access to the VPA service provider, receiving a response to the vocal query, and delivering the response to the user formatted as speech through an audio output of the device, at least one audio parameter of the response set based on at least one parameter of an environment proximate the device.

In some implementations, the method comprises formatting a volume of the response and/or a tone of the response based on the at least one parameter. An audio parameter of the response may be formatted based on an identity of the user. An audio parameter of the response may be formatted based on a time of day.

In accordance with another aspect, there is provided a smart speaker. The smart speaker comprises a microphone, at least one speaker, and a processor. The processor is configured to recognize a spoken user query received at the microphone, communicate the user query to a virtual personal assistant service provider, receive a response to the user query from the virtual personal assistant service provider, format the response as speech, and render the response to a user through the at least one speaker. At least one audio parameter of the response is set based on at least one parameter of an environment proximate the smart speaker.

The processor may be configured to set a volume of the response based on one or more of a volume of the spoken user query, a volume of background noise sensed by the microphone, an identity of the user, a location of the user, a time of day, a physiological parameter of the user, or a response by the user to a previous response provided by the smart speaker. The processor may be configured to set a tone of the response based on one or more of a tone of the spoken user query, a frequency spectrum of background noise sensed by the microphone, an identity of the user, a location of the user, or a time of day.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
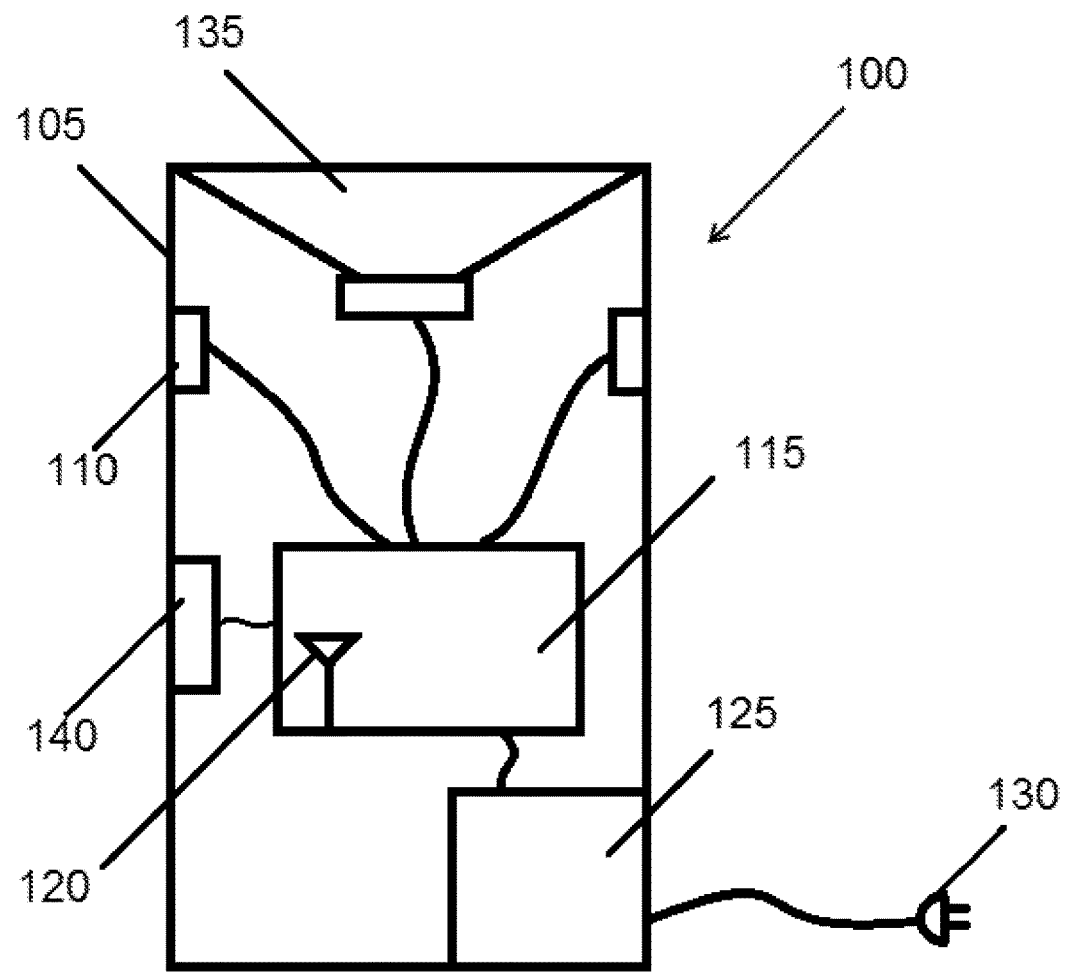
FIG. 1A is a simplified schematic view of an example of a smart speaker including functionality to access a VPA service provider.

Aspects and implementations disclosed herein are not limited to the details of construction and the arrangement of components set forth in the following description or illustrated in the drawings. Aspects and implementations disclosed herein are capable of being practiced or of being carried out in various ways.

Aspects and implementations disclosed herein may be applicable to a wide variety of smart speakers having access to virtual personal assistant (VPA) services. Aspects and implementations of smart speakers disclosed herein include functionality that renders the smart speakers situationally aware. Based on one or more measured or monitored parameters, aspects and implementations of smart speakers may tailor a response provided by a VPA service to a user query or command (a VPA response) to be more appropriate given the one or more measured or monitored parameters. Tailoring the response to the user query or command may include providing the same content, e.g., the same words in the same sequence as would be provided in an untailored response, but with one or more audio components such as volume, tone, speed, etc., modified from a default volume, tone, speed, etc. Examples of measured or monitored parameters that the smart speaker may use to tailor a VPA response may include any one or more of volume of a user query or command, intonation of a user query or command, speed of speech in a user query or command, ambient noise level, time of day, day of the week, location of a user providing the query or command, identity of a user providing the query or command, or a response by a user to a response given by the VPA service through the smart speaker.

A simplified schematic diagram of a smart speaker is illustrated in FIG. 1, generally at 100. The smart speaker 100 includes a body 105. On or within the body 105 are mounted one or more audio sensors, for example, microphones 110. In some implementations the provision of multiple microphones 110 may enable the smart speaker to triangulate the direction of origination of an audio signal, for example, a query or command of a user or location of an audio source, for example, a user. In other implementations a single directional microphone 110 may provide for the smart speaker to determine a direction of origination of the audio signal. The microphone or microphones 110 (hereinafter referred to in the singular for simplicity), along with other components of the smart speaker 100 are electrically connected to circuitry 115 including at least one processor disposed within the body 105 of the smart speaker. Circuitry 115 is illustrated in FIG. 1 as a single block, but may include multiple modules, sub-circuits, or processors for performing the various functions of the smart speaker 100, for example, audio signal processing circuitry, communications circuitry, memory, etc.

The circuitry 115 may include or be electrically coupled to one or more antennae 120 (only one of which is illustrated in FIG. 1A). The antenna or antennae 120 (hereinafter referred to in the singular for simplicity) may be utilized by the smart speaker 100 to connect to a VPA service, the internet, or another source to search for information for a response to the query of a user. The smart speaker 100 may utilize the antenna 120 to connect to the internet via a cellular signal or via Wi-Fi through an internet router.

The antenna 120 may also be used by the smart speaker 100 to communicate with other devices. In a home or building equipped with smart devices, for example, a smart thermostat, lights, or appliances that may be controlled via Wi-Fi, etc., the smart speaker 100 may utilize the antenna 120 to relay commands from a user to the smart devices. For example, a user may provide an audio command to the smart speaker 100 to turn on the lights in a room of a house, and the smart speaker 100 may interpret the command and send the appropriate signal via Wi-Fi (in some implementations through a Wi-Fi router) to a controller of the lights in the room to turn the lights on. In other implementations, the smart speaker 100 may utilize the antenna 120 to locate or communicate with devices, for example, cellular telephones or other mobile computing devices to gather information or send commands to the devices. For example, in some implementations, the smart speaker 100 may utilize the antenna 120 to identify the IP address of a cellular telephone or other computing device in the proximity of the smart speaker 100 and may identify a user associated with the cellular telephone or other computing device. The smart speaker 100 may use a single antenna 120 to communicate via Wi-Fi, cellular, Bluetooth or other communication protocols, or may include dedicated antennae 120 for different communication protocols.

The smart speaker 100 further includes a power supply 125. The power supply 125 may receive power from an electrical outlet through a plug 130 and/or may include one or more batteries or other power storage devices.

Figure 1B:
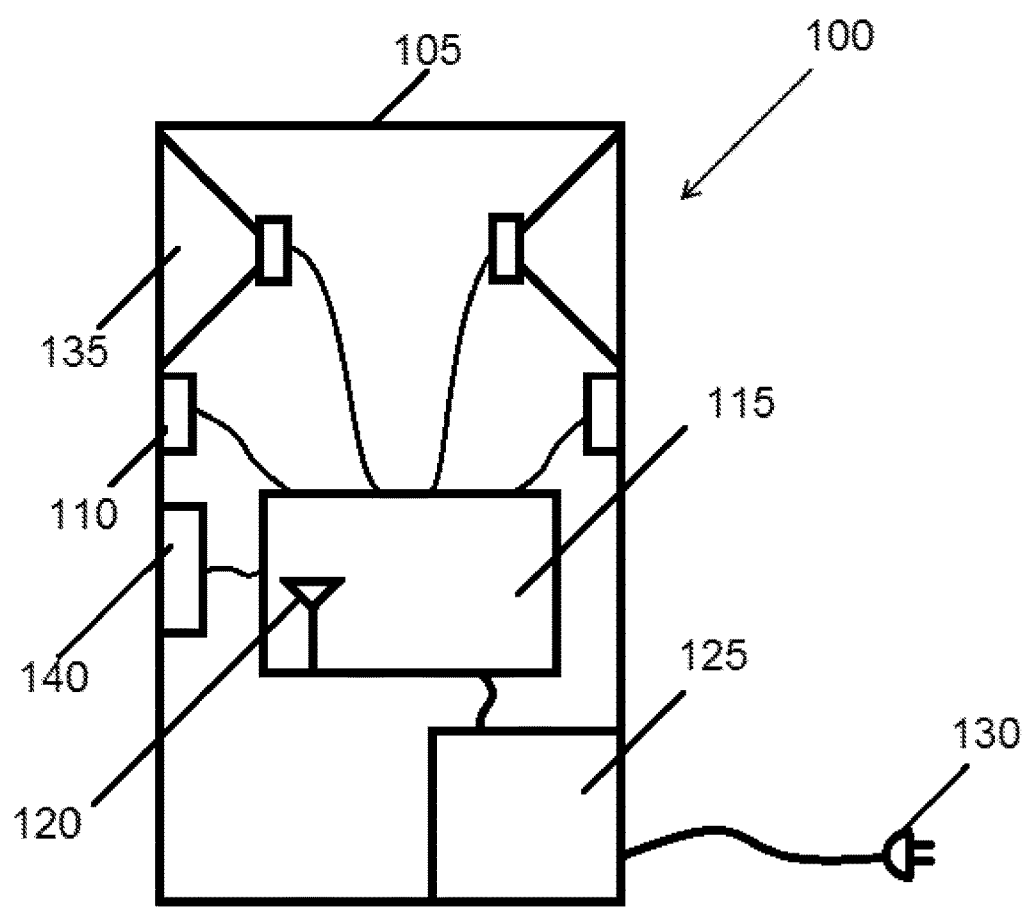
FIG. 1B is a simplified schematic view of another example of a smart speaker including functionality to access a VPA service provider.

At least one audio output, for example, speaker 135 is included in the smart speaker 100 for outputting audio responses to a query by a user and/or to provide alerts or verifications of receipt or completion of commands or to provide information regarding the condition or settings of the smart speaker 100. In some implementations, as illustrated in FIG. 1B, multiple speakers 135 may be provided. The multiple speakers 135 may be utilized to control a direction of audio output to a user.

A user interface 140, which may include manually activated controls, and in some implementations, a display, may be disposed on the body of the smart speaker 100 to allow for a user to change settings (e.g., power on/off, volume, etc.) of the smart speaker 100 or to program the smart speaker 100. In other implementations the setting and/or programming of the smart speaker 100 may be adjusted wirelessly though antenna 120, for example, using an application on a user's cell phone or other computing device. Additionally or alternatively the setting and/or programming of the smart speaker 100 may be adjusted using a cable connected to the user interface 140 and coupled to an external device, for example, a user's cell phone or other computing device.

The smart speaker 100 may be implemented in various form factors. In some implementations, the smart speaker 100 is designed to be placed in a fixed location of a desk or countertop. In other implementations, the smart speaker 100 is included in a vehicle. In further implementations, the smart speaker 100 is implemented in headphones or in software in a mobile computing device, for example, a cell phone. Implementations of the smart speaker 100 described above with reference to FIG. 1A may be modified as appropriate for a particular implementation. For example, when included in a vehicle, headphones, or cell phone the smart speaker 100 may not include a separate power source 125 or plug 130 and the various components of the smart speaker 100 may be distributed throughout the vehicle, headphones, or cell phone or implemented in software or in hardware modules that are shared with other systems of the vehicle, headphones, or cell phone.

Figure 1C:
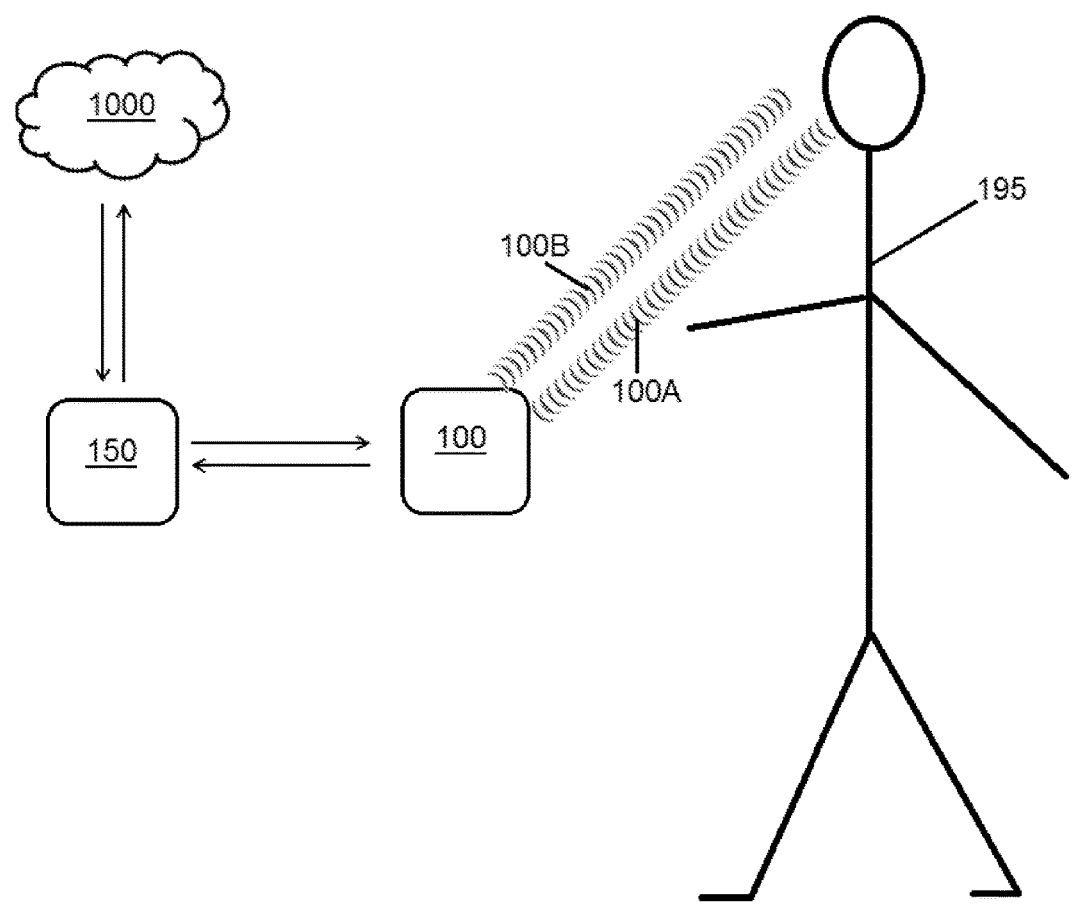
FIG. 1C illustrates a user providing a query to a smart speaker including functionality to access a VPA service provider and the smart speaker responding to the user.

FIG. 1C illustrates one example of user interaction with a smart speaker 100. As shown, the user 195 may speak an audio query 100A to the smart speaker 100. The smart speaker 100 receives the audio query 100A through a microphone and performs a speech-to-text transformation of the audio query 100A. Alternatively, the smart speaker 100 records the audio query and sends it to another system, for example, a cloud-based VPA service provider 1000, as an audio file. The smart speaker 100 requests that the VPA service provider 1000 searches in a database, for example, the internet or cloud for information to respond to the user's query 100A. The smart speaker 100 may access the VPA service provider or other source of information via an internet router 150. The smart speaker 100 retrieves the information needed to respond to the user's query 100A from the VPA service provider in text form, performs a text-to-speech transformation on the received information and outputs an audio response 100B to the user 195. Alternatively, the text-to-speech transformation of the response may be performed by the VPA service provider and the response may be sent to the smart speaker 100 from the VPA service provider as an audio file.

Figure 1D:
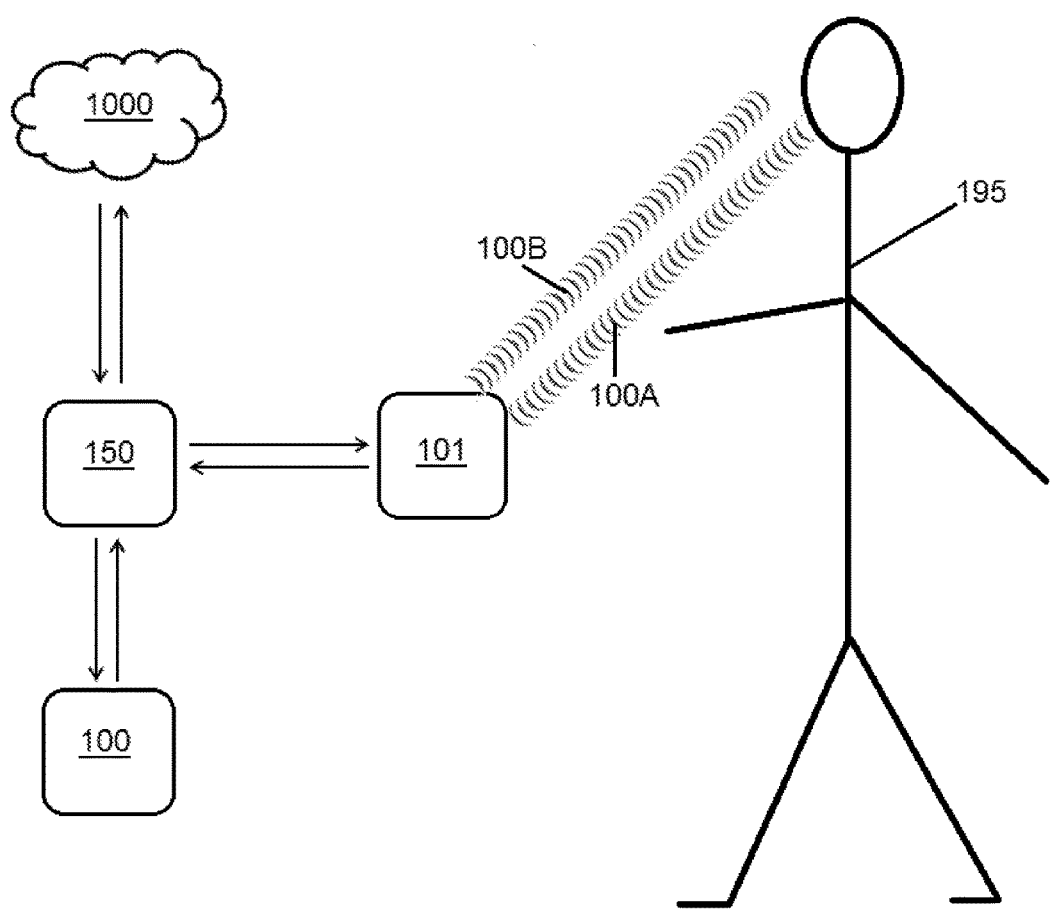
FIG. 1D illustrates a system including a smart speaker in communication with a VPA service provider.

In other implementations, VPA functionality, e.g., sending a request for information to a VPA service provider or other source of information and receiving a response to the request for information from the VPA service provider or other source of information may be performed in a device separate from a device that receives a user query or command or renders the response to the user query or command. As illustrated in FIG. 1D, a user 195 may provide a spoken query 100A to a smart speaker 101. The user 195 may speak a wake word to the smart speaker 101 prior to providing the spoken query 100A so the smart speaker 101 will interpret the spoken query 100A as one to which the user 195 desires a response. The smart speaker 101 may include substantially the same components as the smart speaker 100 described with reference to FIGS. 1A and 1B, but may lack functionality to send queries to a VPA service provider or other data source and receive responses to queries from the VPA service provider or other data source. In one non-limiting example, the smart speaker 101 is one of the SoundTouch® audio playback devices available from the Bose Corporation or a similar streaming audio player. The smart speaker 101 may relay the spoken query 100A, optionally after recording the spoken query 100A, to a smart speaker 100 having the ability to request and receive a response to the user query 100A from a VPA service provider or other source of information as described above, for example, to service provider or other source of information in the cloud 1000. The smart speaker 100 may receive a response to the user query from the VPA service provider or other source of information and communicate the response to the smart speaker 101 for rendering. The smart speaker 101 may render the response as an audio response 100B to the user 195 after applying appropriate signal conditioning to the response to vary one or more audio parameters of the response based on one or more environmental variables of the environment about the smart speaker 101.

Communications between the smart speaker 101, smart speaker 100, and VPA service provider 1000 may be through a router 150 as illustrated in FIG. 1D or may include direct communication (wired or wireless) between the smart speaker 101 and smart speaker 100.

It should be understood that reference to a smart speaker 100 herein includes systems in which a single component receives spoken user queries and provides audio responses to a user as well as requests and receives responses to the queries from an external source, as well as to systems as illustrated in FIG. 1D in which a first device receives user queries and renders responses to a user and a second device requests and receives responses to the user queries and communicates the responses to the first device for rendering.

As discussed above, the smart speaker 100 may be situationally aware and may tailor responses to user queries or commands based on one or more measured or monitored parameters. One parameter may be the volume of the voice of a user giving an oral query or command to the smart speaker 100. In some implementations, the smart speaker 100 may include a volume control that a user may set to a default level. In some instances the smart speaker 100 may respond to a query or command at a volume different than a set or default volume. For example, if a user is getting up early and other members of the user's household are still asleep, a user may verbally query the smart speaker 100 for information such as the day's weather forecast at a low volume. The smart speaker 100 may receive the query through a microphone 110 and determine if the volume of the user's voice is higher or lower than typical when interacting with the smart speaker 100 or higher or lower than a pre-determined threshold. If the query was provided by the user speaking softly, the smart speaker 100 may provide an audible response to the query at a volume lower than the default or set volume. In another example, the smart speaker 100 may provide a response that is louder than usual, for example, to overcome background noise or if the user is far from the smart speaker 100. The user may provide a query or command to the smart speaker 100 in an elevated volume and the smart speaker 100 will respond to the query or command at a corresponding volume higher than the default or set volume. In some implementations the smart speaker 100 may have a set number of volume adjustment levels, for example, 25%, 50%, 100%, 125%, 150%, and 200% of the default or set volume. In other implementations the smart speaker 100 may respond to a user's query at a volume within a continuum of volumes based on the volume of the user's query.

In other implementations, the smart speaker 100 may respond to queries or commands in a tone that is based on the volume or tone of a command or query provided by a user to the smart speaker 100. For example, if the user provides a command or query to the smart speaker 100 at a low volume or in a whisper, the smart speaker may provide an audible response to the command or query that sounds like a whisper. Conversely, if the user shouted a command or query the smart speaker 100, the smart speaker 100 may respond with an audible response that sounds like a shout. In some implementations, if the user provides the query or command in a particular tone, for example, if a child provides the query or command in a tone typical of that of a voice of child, the smart speaker 100 may respond with a response that sounds like the voice of a child. Similarly, the tone of the response provided by the smart speaker 100 may be provided as a female voice or a male voice based on whether the user query or command is provided in a female or a male voice. Signal processing circuitry in the circuitry 115 of the smart speaker 100 may apply audio filtering/signal processing to the response to produce the response in the alternate tone.

The smart speaker 100 may additionally or alternatively modify the tone of a response to a command or query from a default tone by applying a bandpass filter to the response. Low frequencies of sound tend to propagate further through buildings than do higher frequencies. Accordingly, if the user provides a command or query to the smart speaker 100 at a low volume or if the smart speaker 100 receives some other indication that it should provide an audio response that does not propagate far, the smart speaker 100 may apply a high pass filter to the audio response, removing low frequency wavelengths from the response.

In some implementations, the smart speaker 100 may include functionality to determine the rapidity of speech of a user providing a command or query to the smart speaker 100 and may adjust the rapidity of rendition of an audio response to the command or query based on the rapidity of speech of the user. If the user provides the command or query by speaking slowly, the smart speaker 100 may provide an audio response to the command or query slowly. Such functionality may be useful if the user is not fluent in English or whatever other language the smart speaker 100 is programmed to respond in and the user wishes to receive a response from the smart speaker more slowly than a default or set response speed to assist the user in understanding the response. Conversely, if the user provides the command or query by speaking rapidly, the smart speaker 100 may provide an audio response to the command or query in a manner replicating rapid speech. Such functionality may be useful if the user is in a hurry and the user wishes to receive a response from the smart speaker more quickly than a default or set response speed.

In other implementations, the smart speaker 100 may monitor or measure the volume level and/or frequency spectrum of background or ambient noise when receiving a wake up phrase and prior to or during receiving a command or query from a user. The smart speaker 100 may take the volume level and/or frequency spectrum of background or ambient noise into account when formatting an audio response to a user command or query. If there is a large amount or high volume of background noise from, for example, multiple people talking or from a television or radio in the vicinity of the smart speaker 100, or due to the smart speaker 100 being in an outdoor environment, the smart speaker 100 may output responses at a higher volume than a default or set volume. In some implementations the smart speaker 100 may have a set number of volume adjustment levels, for example, 25%, 50%, 100%, 125%, 150%, and 200% of the default or set volume. In other implementations the smart speaker 100 may respond to a user's query at a volume within a continuum of volumes based on the volume of the background or ambient noise. Additionally or alternatively, the smart speaker 100 may analyze the frequency spectrum of the background or ambient noise. The smart speaker 100 may modify the volume of only certain frequencies of an audio response, for example, frequencies at which the background or ambient noise is louder than at other frequencies. In other implementations, the smart speaker 100 may increase the volume of the response at frequencies at which the background or ambient noise is softer or less loud than at other frequencies so that the audio response may be more readily distinguished from the background or ambient noise by a user.

The smart speaker 100 may dynamically adjust the volume and/or tone of responses to commands or queries based on factors other than parameters of the voice of a user that provides a command or query to the smart speaker 100. In some implementations, the smart speaker 100 may include a clock (e.g., within circuitry 115, FIG. 1) or receives indications of the time and may be programmed to provide audio responses to commands or queries at a reduced volume below the default or set volume during nighttime hours when members of a household may be expected to be sleeping. The reduced volume may be a volume that is set by a user of the smart speaker 100. Additionally or alternatively, the smart speaker 100 may be programmed to provide audio responses to commands or queries in a tone resembling a whisper or with lower frequencies of the audio response suppressed (e.g., with a high pass filter applied to the audio response) during nighttime hours or other time periods set by a user.

Figure 2:
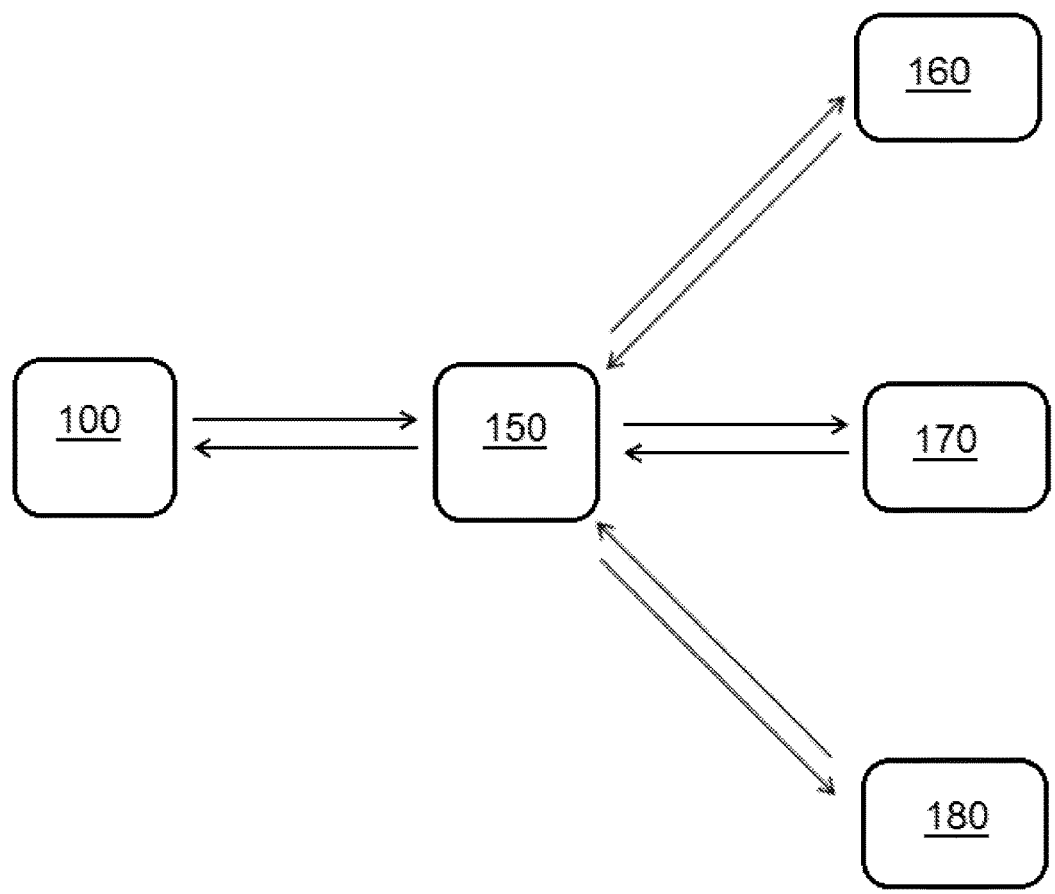
FIG. 2 illustrates communications between a smart speaker and various devices through a router.

In addition, the smart speaker 100 may query other smart devices that it may be in communication with, for example, lights 160 or entertainment system(s) 170 (e.g., other smart speakers, televisions, radios, etc.), or even physiological monitors 180 of residents of the household, either directly or via a Wi-Fi router 150 (See FIG. 2). If the lights 160 or entertainment system(s) 170 are active and/or if the physiological monitors 180 indicate that the residents of the household are awake, this may provide an indication that people in the household are awake and a reduced volume response to queries or commands may not be warranted and the smart speaker 100 may respond to queries or commands at a default or set volume. If the lights 160 or entertainment system(s) are inactive and/or if the physiological monitors indicate that the residents of the household are asleep this may provide an indication that people in the household are asleep and a reduced volume response to queries or commands may be warranted. In other implementations, a physiological monitor 180 of a user may provide information regarding the heart rate or respiration rate of a user. An elevated heart rate or respiration rate of the user may be indicative of the user being in an excited state or in a state of exercising or having just finished exercising. In response to the smart speaker 100 receiving an indication from the physiological monitor 180 of the user of an elevated heart rate or respiration rate of the user, the smart speaker 100 may provide audio responses to queries or commands of the user at a volume elevated above a default or set volume.

Figure 3:
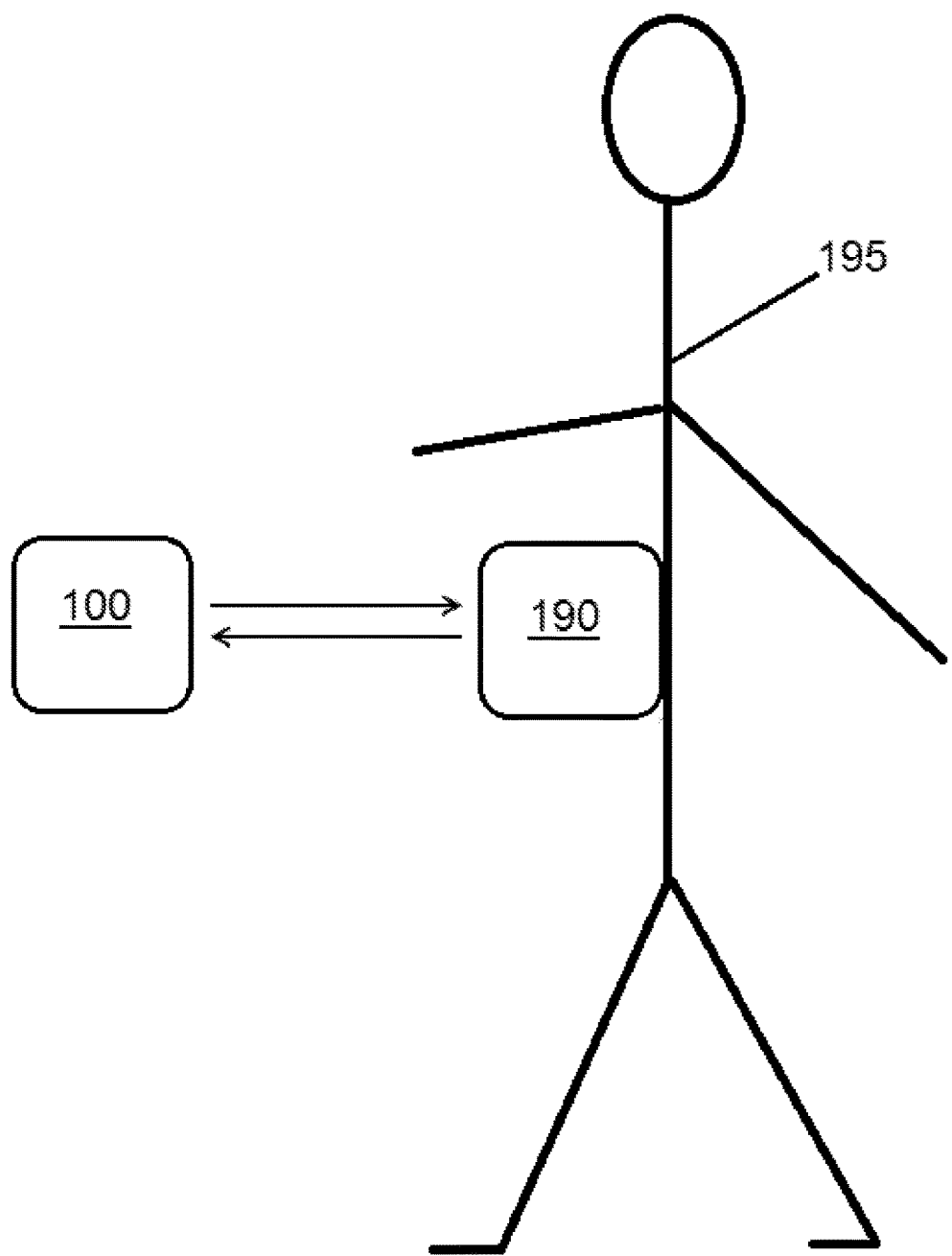
FIG. 3 illustrates communications between a smart speaker and a device of a user.

The smart speaker 100 may also include functionality to communicate with one or more other devices 190, for example, a cell phone, a smart watch, etc. of a user 195. (See FIG. 3.) The smart speaker 100 may query the device 190 for information from which it may derive an identity of the user. For example, the smart speaker 100 may request the IP address of the device 190 and attempt to match the IP address of the device 190 to a user in a lookup list in a memory of the circuitry 115 of the smart speaker 100 or in the cloud 1000 (FIG. 1B). Once the VPA determines an identity of the user 195, it may tailor responses to queries or commands from the user in a manner appropriate for the user. For example, if the smart speaker 100 determines that the user is an elderly person who may have some hearing loss, the smart speaker 100 may respond to queries or commands from the user with an audio response provided at an increased volume relative to a default or set volume. In some implementations, different users may program the smart speaker 100 with different preferences for responses to queries or commands, for example, pitch of the audio response, whether the audio response should be in a female or male voice, volume of the audio response, speed of the audio response, etc.

In some implementations, the smart speaker 100 may listen for an indication that a user did not understand an audio response provided by the smart speaker 100 to a command or query. If such an indication is detected the smart speaker 100 may repeat the audio response, potentially at a slower "speaking" rate and/or a higher volume. For example, if the smart speaker 100 provides an audio response to a command or query of a user at a first speaking rate and a first volume, if the user responds with a vocal phrase indicative that the user did not understand the response, for example, by saying "What?," "What's that?," "Huh?," "I don't understand," "please repeat," etc., the smart speaker 100 may repeat the response at a slower speaking rate and/or higher volume.

Smart speakers 100 equipped with multiple microphones 110 or with a directional microphone may detect the direction from which a user command or query originated and/or a location of a user providing the command or query. The smart speaker 100 may use this direction or location information to direct a response toward the user that gave the command or query. For example, in smart speakers 100 including more than one speaker 135 (see, e.g., FIG. 1B), the relative volumes of the different speakers may be modulated to direct the majority of the sound energy in the response in the direction of the user that provided the command or query. In some implementations, a smart speaker 100 may be in a master-servant relationship with other smart speakers 100 or may have the capability of controlling a separate smart speaker or audio device. In such implementations, the smart speaker 100 that received the results of a query from a user may direct a smart speaker 100 or separate smart speaker or audio device that is closer to the user than the smart speaker 100 that received the results of a query to provide the audible response to the query to the user.

Figure 4:
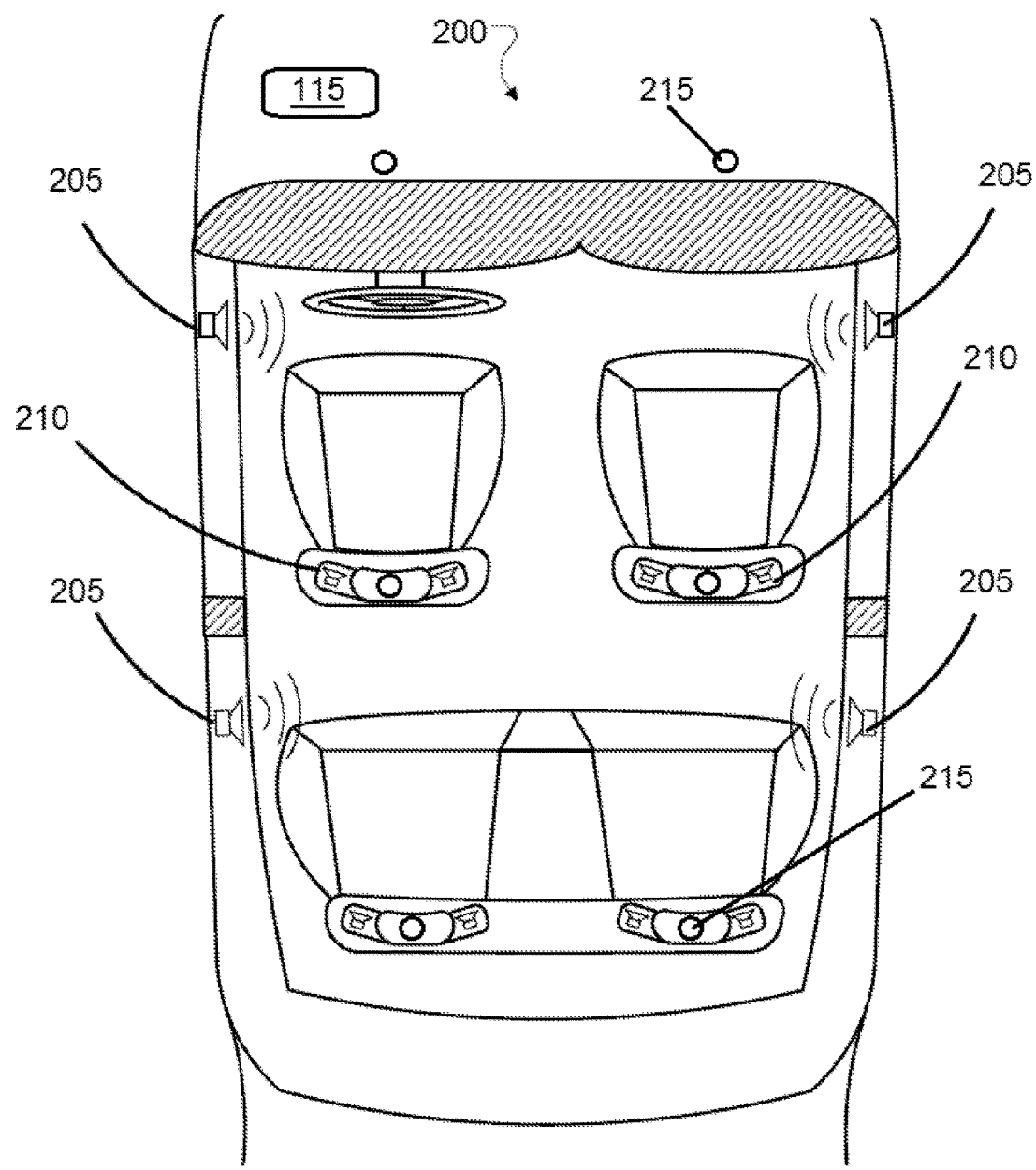
FIG. 4 illustrates a vehicle equipped with functionality to access a VPA service provider.

In one particular implementation a smart speaker 100 having functionality to access a VPA service may be implemented in the electronics of a vehicle, for example, a car or SUV. The smart speaker 100 may include dedicated circuitry 115, or may be implemented as software in a computer of the vehicle 200. As disclosed in international applications PCT/US2017/021521 and PCT/US2017/021625, assigned to the same assignee as the present application, the vehicle 200 may include shared speakers 205 and dedicated speakers 210 for each passenger in the vehicle. The dedicated speakers 210 may be built into the headrest or other portion of the seats of the vehicle 200. (See FIG. 4.) The vehicle 200 may include one or more microphones 215 in a portion of the vehicle 200, for example, in the dashboard, or in the headrests of the seats of the vehicle. The microphones 215 may be utilized to receive a query or command to the smart speaker implemented in the electronics of a vehicle and may be used by the smart speaker to determine which user/seat the query or command originated from. An audio response to the query or command may be provided by the smart speaker to the dedicated speakers associated with the user/seat the query or command originated from. In some implementations cross talk cancellation or noise cancelling technologies may be utilized by the dedicated speakers associated with the user/seats other than that which the query or command originated from to at least partially lower the perceived volume of the audio response at the user/seats other than that which the query or command originated from.

Figure 5:
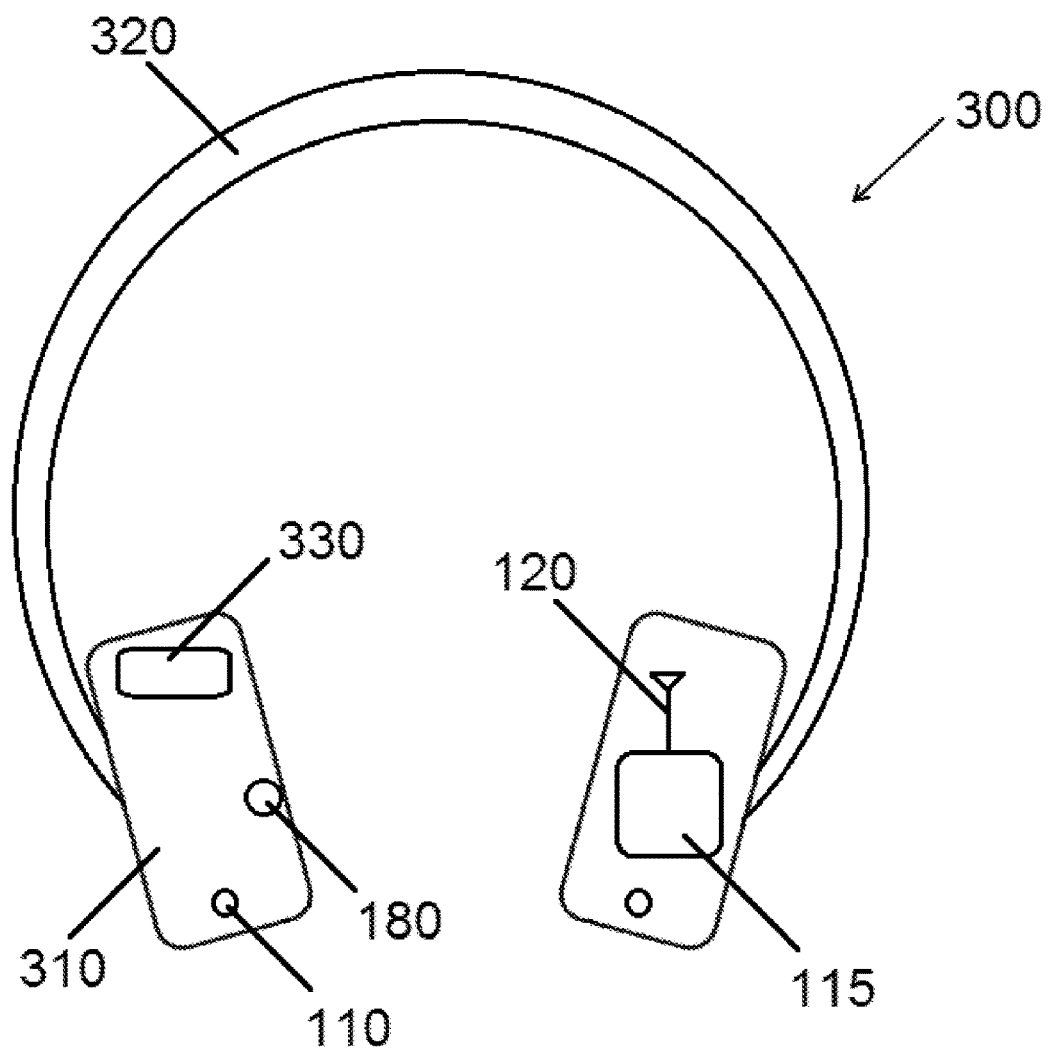
FIG. 5 illustrates headphones equipped with functionality to access a VPA service provider.

A smart speaker having functionality to access a VPA service may, in some implementations, be included in headphones. As illustrated in FIG. 5, headphones, indicated generally at 300, may include a pair of ear cups 310 coupled to one another by a headband 320. Each of the ear cups 210 include at least one speaker (not shown for the sake of clarity) to deliver audio, for example, music to the ears of a user. VPA functionality may be provided in the headphones 300 by incorporating VPA access circuitry 115 and one or more microphones 110 into the headphones 300, for example, into one or more of the ear cups 310. The VPA access circuitry 115 may include one or more antennae 120 to enable communication with the internet or other devices as described with reference to the various implementations of the smart speaker 100 above. In some implementations, the headphones 300 are wireless headphones and the antenna 120 may be shared between the VPA access circuitry 115 and circuitry of the headphones 300 used to provide wireless connectivity. In some implementations, the headphones 300 may also include a location determination system, for example, a GPS receiver 330 and associated circuitry and/or a physiological monitor 180 (e.g., a heart-rate monitor). It should be understood that the various components illustrated in FIG. 5, for example, VPA access circuitry 115, antenna 120, GPS receiver 330, microphones 110, or physiological monitor 180 may be located in different positions with in the headphones 300, for example, at least partially in the headband 320, or may be at least partially included in a device to which the headphones 300 wirelessly connect, for example, a portable music player or cell phone. Electrical connections between components are omitted from FIG. 5 for clarity.

In use, a user may provide a vocal query or command to the headphones 300 that the VPA functionality provides a response to. The response may be provided through the speakers in the ear cups 310, optionally while reducing the volume or muting any music or other audio content a user is listening to through the headphones 300. The volume or rapidity of speech of the response may be modified based on the volume or rapidity of speech of the user's query or command as discussed above with reference to the various implementations of the smart speaker 100. The headphones may also alter the volume or speed of an audio response to a user's query or command based on other factors such as heart rate of the user, identity of the user, etc., as discussed above with reference to the various implementations of the smart speaker 100. The headphones 300 may be capable of determining a location of a user wearing the headphones 300 using the GPS receiver 330 and may adjust the volume of an audio response to a user's query or command based on the location of the user, for example, providing louder responses if the user is in an urban environment, and softer responses if the user is in a rural location.

In any of the above implementations, the user may cause the smart speaker 100 to respond in a manner that takes into account any of the parameters discussed above by providing a modified of alternate wake up phrase to the smart speaker 100 prior to providing the command or query. For example, if the user wishes the smart speaker to take the user's voice volume into account to adjust the volume of a response, the user may say the wake up phrase "Volume, Siri" instead of "Hey, Siri." Alternatively, the smart speaker 100 may include a switch or may respond to a spoken command to enable or disable the modification or formatting of responses based on the one or more monitored or measured parameters.

Prophetic Example 1

A smart speaker located in the kitchen of a household of a user has a volume selector set to a first level. The user wakes up in the middle of the night while other members of the household are asleep and goes to the kitchen for a midnight snack. The user speaks a wake up word to the smart speaker in a whisper and asks the smart speaker what the weather forecast for the following day is. The smart speaker compares the volume of the user request regarding the weather forecast against a pre-set volume threshold and determines that the user is speaking at a reduced volume compared to the pre-set volume threshold. The smart speaker sends the user request to a VPA enabled device through a Wi-Fi network in the household of the user. The VPA queries a VPA service provider in the cloud for the weather report for the following day and receives the weather report from the VPA service provider. The VPA communicates the weather report to the smart speaker. The smart speaker renders the weather report to the user at a reduced volume as compared to a volume the smart speaker would render audio based on the set volume level.

Prophetic Example 2

An elderly user speaks a wake up word and requests information regarding the readiness of a prescription to a smart speaker. The smart speaker detects that a mobile phone has come into proximity of the smart speaker. The smart speaker queries the mobile phone for identification information, for example, an IP address, and receives the identification information from the mobile phone. The smart speaker conveys the information request and identification information from the mobile phone to a VPA enabled device through a Wi-Fi network in the household of the user. The VPA enabled device queries a VPA service provider in the cloud for information regarding the readiness of the prescription and receives a response that the prescription is ready for pickup. The VPA service provider also accesses an account associated with the VPA and searches for information correlating the identification information from the mobile phone with a particular user and determines that the mobile phone belongs to the elderly user. The VPA communicates the information regarding the readiness of the prescription and the identity of the user to the smart speaker. The smart speaker renders the information regarding the readiness of the prescription to the user at a preset volume associated with the elderly user in a memory of the smart speaker that is increased as compared to a default volume level and a preset speed associated with the elderly user in the memory of the smart speaker that is reduced as compared to a default response speech speed.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of operating a situationally aware speaker, the method comprising:
    receiving an indication of at least one parameter of an environment proximate the situationally aware speaker;
    receiving audio information at the situationally aware speaker from a virtual personal assistant, wherein receiving the audio information comprises receiving an audio response to a query spoken to the situationally aware speaker by a user; and
    modifying the audio information based on the indication of the at least one parameter, wherein modifying the audio information comprises varying a volume of the audio response based on at least two of a volume of the query, an identity of the user, or a time of day.

2. The method of claim 1, wherein modifying the audio information includes one or more of adjusting a volume, a tone, an equalization, a tone, or a speed of rendering of the audio information.

3. The method of claim 1, wherein the at least one parameter includes one or more of a volume of a query provided to the situationally aware speaker, a volume of background noise, a frequency spectrum of background noise, an identity of the user, a location of the user, a time of day, a physiological parameter of a person proximate the situationally aware speaker, a response by the user to a previous response provided by the situationally aware speaker, or a state of activity of one or more devices proximate the situationally aware speaker.

4. The method of claim 1, further comprising rendering the audio response through the situationally aware speaker.

5. The method of claim 1, wherein modifying the audio information comprises varying the volume of the response based on at least the volume of the query.

6. The method of claim 1, comprising modifying the audio information by setting the volume of the response based on at least the indication of the at least one parameter.

7. The method of claim 1, comprising setting the volume of the response based on at least a volume of background noise sensed by an audio sensor of the situationally aware speaker.

8. The method of claim 1, wherein modifying the audio information comprises varying the volume of the response based on at least the identity of the user of the situationally aware speaker.

9. The method of claim 1, comprising setting the volume of the response based on at least a location of a user of the situationally aware speaker.

10. The method of claim 9, further comprising selecting a speaker through which to deliver the response based on the location of the user.

11. The method of claim 1, wherein modifying the audio information comprises varying the volume of the response based on at least the time of day.

12. The method of claim 1, comprising setting the volume of the response based on at least a physiological parameter of a person within hearing distance of the situationally aware speaker.

13. The method of claim 1, comprising setting the volume of the response based on at least a response by the user to a previous response provided by the situationally aware speaker.

14. The method of claim 1, comprising setting the volume of the response based on at least a state of activity of one or more devices proximate the situationally aware speaker.

15. The method of claim 1, comprising setting a tone of the response based on the indication of the at least one parameter.

16. The method of claim 15, comprising formatting the response as one of a simulated whisper, a simulated shout, or with low frequency components of the response removed.

17. The method of claim 15, comprising setting a tone of the response based on one or more of a volume of the vocal query, a volume of background noise sensed by the audio sensor, an identity of the user, a location of the user, a time of day, a physiological parameter of a person within hearing distance of the situationally aware speaker, a frequency spectrum of background noise sensed by the audio sensor, or a response by the user to a previous response provided by the situationally aware speaker.

18. The method of claim 1, comprising setting a speed of simulated speech of the response based on one of a speed of speech of the vocal query or an identity of the user.

19. A method of dynamically formatting a response of a virtual personal assistant (VPA) service provider to a query of a user, the method comprising:
   receiving an indication of a vocal query received from a user through an audio sensor of a device having access to the VPA service provider;
   receiving a response to the vocal query; and
   delivering the response to the user formatted as speech through an audio output of the device, at least one audio parameter of the response set based on at least one parameter of an environment proximate the device, wherein a volume of the response is varied based on at least two of a volume of the query, an identity of the user, or a time of day.

20. The method of claim 19, comprising formatting the volume of the response based on the at least one parameter.

21. The method of claim 19, comprising formatting a tone of the response based on the at least one parameter.

22. The method of claim 19, comprising formatting an audio parameter of the response based on an identity of the user.

23. The method of claim 19, comprising formatting an audio parameter of the response based on a time of day.

24. A smart speaker comprising:
   a microphone;
   at least one speaker; and
   a processor configured to:
      recognize a spoken user query received at the microphone;
      communicate the user query to a virtual personal assistant service provider;
      receive a response to the user query from the virtual personal assistant service provider;
      format the response as speech, at least one audio parameter of the response set based on at least one parameter of an environment proximate the smart speaker;
      vary a volume of the response based on at least two of a volume of the user query, an identity of the user, or a time of day; and
      render the response to a user through the at least one speaker.

25. The smart speaker of claim 24, wherein the processor is further configured to set the volume of the response based on one or more of a volume of background noise sensed by the microphone, a location of the user, a physiological parameter of the user, or a response by the user to a previous response provided by the smart speaker.

26. The smart speaker of claim 24, wherein the processor is configured to set a tone of the response based on one or more of a tone of the spoken user query, a frequency spectrum of background noise sensed by the microphone, an identity of the user, a location of the user, or a time of day.

* * * * *